United States Patent [19]
Lin

[11] Patent Number: 4,571,531
[45] Date of Patent: Feb. 18, 1986

[54] AUTOMATIC PROTECTIVE CIRCUIT SYSTEM FOR EMERGENCY LIGHTS

[76] Inventor: Ming-Hsin Lin, 4, Lane 110, Hsiu-Nan Rd., Pei-teng District, Taichung, Taiwan

[21] Appl. No.: 598,988

[22] Filed: Apr. 11, 1984

[51] Int. Cl.$^4$ ............................................. H02J 7/00
[52] U.S. Cl. ........................................ 320/2; 320/14; 307/66; 362/183
[58] Field of Search ...................... 307/66; 320/13, 14, 320/9, 2–5; 362/183

[56] References Cited

U.S. PATENT DOCUMENTS

| | | | |
|---|---|---|---|
| 3,710,134 | 1/1973 | Guthart | 307/66 |
| 3,976,986 | 8/1976 | Zabroskie | 307/66 X |
| 4,150,302 | 4/1979 | Roche | 307/66 |
| 4,156,891 | 5/1979 | Roche | 307/66 X |

Primary Examiner—R. J. Hickey
Attorney, Agent, or Firm—McCormick, Paulding & Huber

[57] ABSTRACT

An automatic protective circuit system for emergency lights includes in combination: a power supply circuit for being coupled with the external power source; a charging circuit connected to the power supply circuit; an upper-limit charging control circuit matched with a lower-limit charging control circuit respectively coupled with the charging circuit and the storage battery; a lower-limit discharging control circuit matched with a pair of double-pole switches and a push-button switch connected to the storage battery and the lights; and a discharge actuating circuit coupled between the power supply circuit and the lower-limit discharging control circuit; thereby, the storage battery of the emergency lights can be effectively protected from being overcharged and overdischarged for extending the life span of the emergency lights.

7 Claims, 5 Drawing Figures

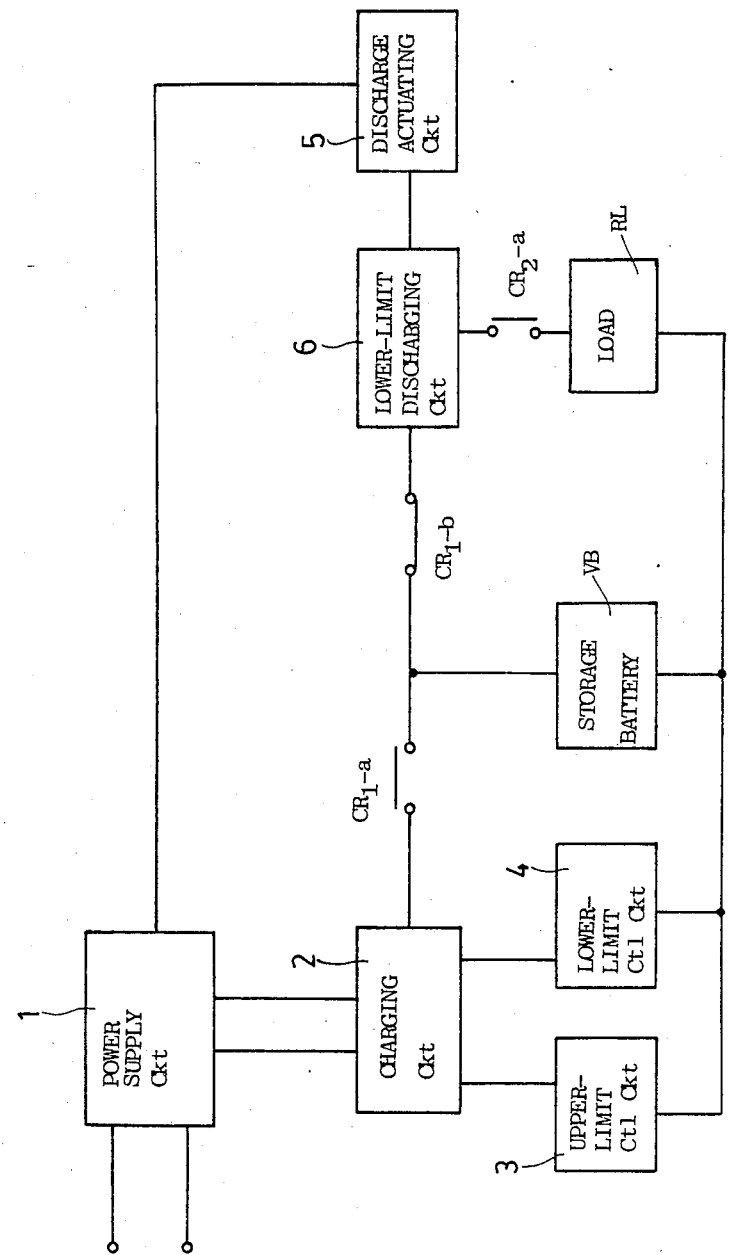
F I G. 2

AUTOMATIC PROTECTIVE CIRCUIT SYSTEM FOR EMERGENCY LIGHTS

BACKGROUND OF THE INVENTION

This invention relates to a protective circuit system for emergency lights, by which circuit system, the emergency light battery can be effectively protected from being overcharged or overdischarged so as to extend the life span of the emergency light and to save energy as well.

Conventionally, all emergency lights are usually kept in charging condition during a normal electrical supply state until a power failure occurs and emergency lighting is then effected which usually lasts till the voltage level of the battery installed in the emergency light drops to zero value. In order to prevent this overcharging and overdischarging operations, the known emergency lights are generally provided with a circuit arrangement for performing a floating charge when the battery thereof is charged to a saturated voltage level and for effecting the cut-off of the current flowing to the load thereof from the battery. Although the floating charge prevents the current of the power source from flowing into the battery, the voltage of the power source thereof still maintains a floating value thereat and continuously charges the battery with pulsating current. As a result, the electrolyte of the battery is kept on evaporating, curtailing the life span of the battery set. On the other hand, the known emergency lights are provided with an overcharging protective device though, it is only effective in a temporary cut-off of the battery power source to the load thereof. The battery parts are still kept in consuming the power of the battery, and damage will be incurred to the battery in case that the ceased charging operation to the battery is prolonged thereat. Therefore, the floating-charge arrangement and the overdischarging device provided in the known emergency lights are imperfect in performing preventive functions in the emergency lights.

SUMMARY OF THE INVENTION

It is accordingly a primary object of this invention to provide a protective circuit system for emergency lights so as to improve the known protective arrangement and overcome the defects associated with the prior art.

With the above and other objects in mind, the present invention provides an automatic preventive circuit system for emergency lights, which circuit system comprises a charging circuitry arrangement having an upper-limit charging control circuit and a lower-limit charging control circuit for being coupled with a power supply circuit connected to the external power source, a lower-limit discharging control circuit matched with a normally-closed contact connected to the storage battery of the emergency light and with a normally-open contact circuit connected to the load, and a discharge actuating circuit coupled between the power supply circuit and the lower-limit discharging control circuit, so that charging and discharging operations of the emergency light can be automatically controlled without suffering the impairment incurred by overcharging and overdischarging actions.

Further characteristics and advantages of this invention will become more apparent from the following detailed description of a preferred but not sole form of embodiment for the invention, given below with reference to the accompanying drawings.

BRIEF DESCRIPTION OF THE DRAWINGS

FIG. 2 is a block diagram of a preferred embodiment of the automatic protective circuit system for emergency lights according to this invention;

DETAILED DESCRIPTION OF THE PREFERRED EMBODIMENT

Figure 1:
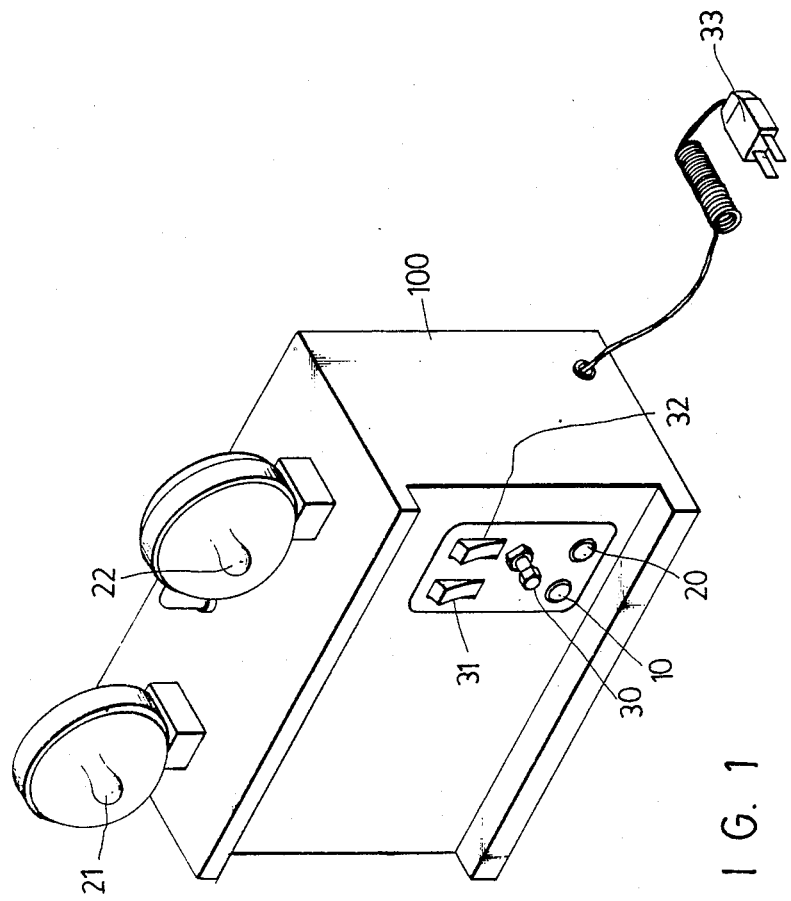
FIG. 1 is an illustrative view of an emergency light provided with an automatic protective circuit system of this invention.

Referring to FIGS. 1 and 2, there is shown a preferred embodiment of an automatic preventive circuit system for emergency light according to this invention, which emergency light, as shown in FIG. 1, is normally combined with a casing body 100, a left light 21 and a right light 22 provided on the top of the casing body 100, a left switch 31 and a right switch 32 separately installed in the front panel in connection with the left and the right lights 21 and 22, a push-button switch 30, a power indicator 10, and a charging indicator 20 also installed in the front panel, and a power-line plug 33 provided at one side of the casing body 100. The switches 31 and 32 are used to perform manual control over the on and off of the lights 21 and 22 respectively while the push-button switch 30 is a normally-open contact designed for turning on the lights 21 and 22 when the power-line plug 33 is disconnected from the power source. The charger indicator 20 is used for indicating the charging condition. When the emergency light 100 is in charging operation, the indicator 20 will be continuously lit thereat, while, when the emergency light 100 is ceased charging, the indicator 20 will go off. The on and off of the power source indicator 10 is automatically matched with the on and off of the external power source connected to the emergency light 100.

As shown in FIG. 2, the preferred embodiment of the protective circuit system according to this invention includes: a power supply circuit 1 coupled with the power line plug 33 for providing power to the emergency light 100; a charging circuit 2 having an upper-limit charging control circuit 3 and a lower-limit charging control circuit 4 connected to the power supply circuit 1 for automatically effecting the on and off of the charging operations; a lower-limit discharging control circuit 6 separately connected to the storage battery VB through a normally-closed contact CR-b and to the load RL thereof through a normally-open contact CR-a for automatically cutting off the discharging action when the voltage level of the storage battery VB drops to a predetermined value; and a discharge actuating circuit 5 connected to the power supply circuit 1 at one end and to the lower-limit discharging control circuit 6 at the other for automatically starting the discharging action whenever power failure occurs in the power supply circuit 1.

Figure 3:
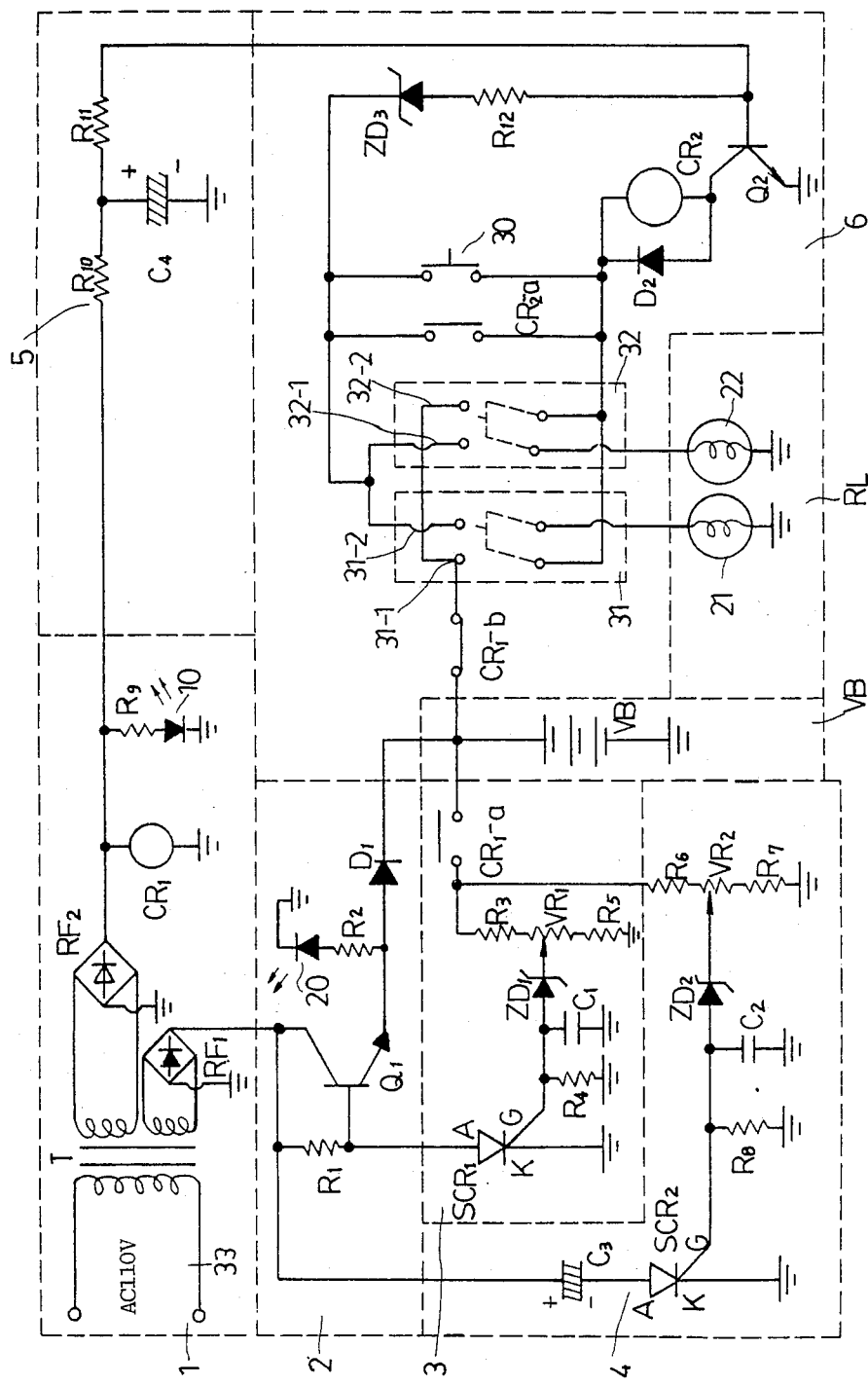
FIG. 3 is a circuit diagram of the preferred embodiment of FIG. 2.

Referring to FIG. 3, there is shown a detailed circuit diagram of the preferred embodiment. The power supply circuit 1 is mainly combined with a transformer T, a pair of bridge rectifiers RF1 and RF2, a relay circuit CR1 and a power source indicator 10, wherein the primary winding of the transformer T is to be connected to the external power source while the separated secondary windings are respectively coupled with the bridge rectifiers RF1 and RF2, of which the output positive terminal of RF1 is connected to the charging circuit 2 and the output negative terminal is grounded thereat, while the output negative terminal of RF2 is grounded and the output terminal is connected to the coil of the relay CR1, whose other end is also grounded thereat. The power indicator 10 includes a light emitting diode and a resistor R9 with one end of the resistor R9 connected to coil of the relay CR1 and one end of the LED grounded thereat.

The charging circuit 2 mainly includes a transistor Q1, a pair of resistors R1 and R2, and LED and a diode D1. Tha base and the collector of the transistor Q1 are jointly connected to the output positive terminal of RF1 while the emitter is connected to the positive terminal of the storage battery VB through the diode D1. The charger indicator 20 combined with the LED and the resistor R2 is connected between the emitter of Q1 and the negative of the power source thereof.

The upper-limit charging control circuit 3 is mainly combined with a silicon controlled rectifier SCR1, a zener diode ZD1, a variable resistor VR1, a capacitor C1 and a plurality of resistors R3, R4, and R5. The anode A of the SCR1 is connected to the base of the transistor Q1 of the charging circuit 2, the cathode K is coupled with the negative of the power source of the emergency light 100, and the gate G is coupled with the positive terminal of the storage battery VB through the zener diode ZD1, the variable resistor VR1, and the normally-open contact CR-a, which gate G is also grounded through a parallel R-C circuit thereof.

The lower-limit charging control circuit 4 also includes a silicon controlled rectifier SCR2, a zener diode ZD2, a polarity capacitor C3, a variable resistor VR2 and a plurality of resistors R6, R7 and R8. The positive terminal of the capacitor C3 is connected to the collector of the transistor Q1 of the charging circuit 2 while the negative is coupled with the anode a of the SCR2 whose cathode K is grounded and the gate G is connected to the positive terminal of the battery VB through the zener diode ZD2, the variable resistor VR2 and the normally-open contact CR-a, which gate G is also grounded through a parallel R-C circuit thereof.

The discharge actuating circuit 5 is mainly combined with polarity capacitor C4 and a pair of resistors R10 and R11 with the positive terminal of the capacitor C4 connected to the output positive terminal of the bridge rectifier RF2, and the negative terminal is grounded thereat.

The lower-limit discharging control circuit 6 includes a pair of double-pole switches 31 and 32, a push-button switch 30, a transistor Q2, a relay circuit CR2, a zener diode ZD3 and other elements. The collector of the transistor Q2 is connected to the output contacts 31-1 and 32-2 through a reversely biased and parallel diode D2 and the relay circuit CR2, the emitter is grounded thereat, and the base is connected to the input contacts 31-2 and 32-1 through a resistor R12 and the zener diode ZD3 wherein the base is also coupled with the positive terminal of the capacitor C4 of the discharge actuating circuit 5 through the resistor R11. The input contacts 31-1 and 32-2 of the double-pole switches 31 and 32 are coupled with the positive terminal of the storage battery VB through the normally-closed contact CR-b of the relay circuit CR1.

As shown in FIG. 3, one terminal of the left light 21 is grounded and the other terminal connected to the input contact 31-2 of the double-pole switch 31 while one terminal of the right light 22 is also grounded and the other terminal connected to the output contact 32-1 of the double-pole switch 32. With regard to the push-button switch 30, its one end is coupled with the base of the transistor Q2 through the zener diode ZD3 and the resistor R12 while its other end is connected to the collector of the transistor Q2 through the paralled connected diode D2 and the relay circuit CR2.

Figure 4:
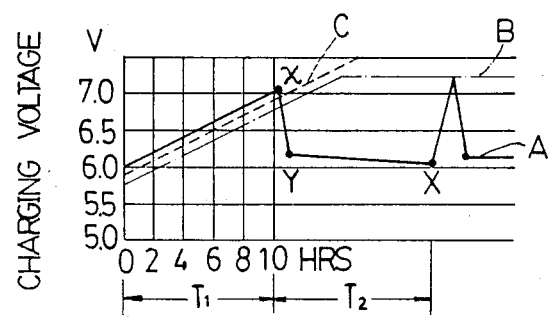
FIG. 4 is an illustrative view of a charging voltage characteristics of the preferred embodiment shown in FIG. 2.

Referring to FIG. 4, there is shown a charging characteristic curve of the preferred embodiment described hereinbefore and illustrated in FIGS. 2 and 3, wherein the alphabets are as follows:

A—denoting a charging voltage characteristic curve of the preferred embodiment of this invention.

B,C—denoting the charging voltage characteristic curve of the known protective circuit.

X—denoting a predetermined upper-limit saturation floating value of the preferred embodiment.

Y—denoting the normal value dropped after the completion of charging according to this invention.

Z—denoting a predetermined lower-limit value of the voltage after ceased charging for a duration according to this invention.

T1—denoting the charging time of the preferred embodiment (10 hours a time).

T2—denoting the repose duration of the preferred embodiment after ceased charging.

Figure 5:
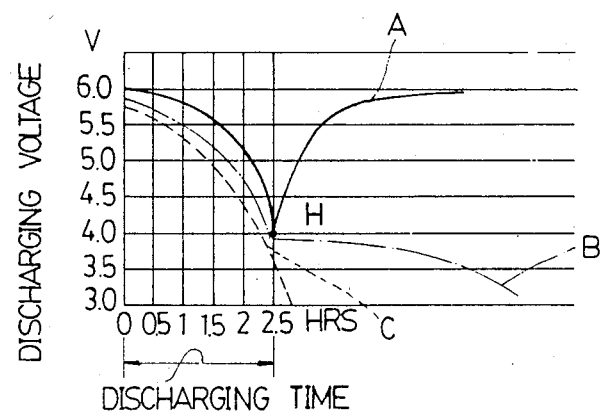
FIG. 5 is an illustrative view of a discharging voltage characteristics of the preferred embodiment shown in FIG. 2.

Referring to FIG. 5, there is shown a discharging characteristic curve of the preferred embodiment according to this invention, wherein the alphabets are as follows:

A—denoting a discharging voltage characteristic curve of the preferred embodiment.

B,C—denoting the discharging voltage characteristic curve of the known protective circuit.

H—denoting the lower-limit voltage value of discharging of the preferred embodiment.

The predetermined values and element specifications of the preferred embodiment are as follows:

CR1,CR2—a relay of 6 VDC.

VB—a 6-volt storage battery

Charging Time—10 hours a time.

The predetermined upper-limit voltage of charging: 7.2 volts.

The predetermined lower-limit voltage of charging: 6 volts.

The predetermined lower-limit voltage of discharging: 4 volts.

Referring to the accompanying drawings, when the plug 33 is connected to the external power source, and the left-light switch 31 and the right-light switch 32 are respectively set at ON positions, the relay CR1 in the power supply circuit 1 is energized and the power light 10 is lit, indicating the power source is in normal condition. At this time, as CR1 is energized, its normally-closed contact CR1-b will be changed to contact a, and the discharge actuating circuit 5 is cut of, so that the left light 21 and the right light 22 are not lit. Meanwhile, as the normally-open contact CR1-a is changed into contact b, the charging circuit 2 will perform its control functions. When the voltage level of the storage battery VB is dropped to the level below the predetermined value (7.2 V), no sufficient current will flow across the gate G of the SCR1 in the upper-limit control circuit 3, and the SCR1 is therefore cut off. At this time, the external current from the power supply circuit 1 will flow to the transistor Q1 through the bridge rectifier RF1 and the transistor R1, starting to charge the storage battery VB with the charger indicator being lit thereat. When the battery VB is charged to a predetermined level (7.2 V), a forward bias from the voltage-regulating circuit formed by VR1—ZD1 will cause the SCR1 to conduct so that the current at the base of the transistor Q1 is guided to the negative of the power source, and the Q1 is thus cut off without current flowing to battery VB therefrom, and the charger indicator 20 also goes off, indicating that the charging operation is ceased thereat. At this time, as the firing angle of the SCR2 in the lower-limit control circuit 4 is configurated to lead the firing angle of the SCR1 in the upper-limit control circuit, when the storage battery VB reached at the predetermined voltage value (7.2 V), it will cause the SCR2 to conduct, enabling the capacitor C3 connected at the anode A to act as a filter thereat through the negative of the power source. Therefore, the pulsating dc current output from the RF1 is filted into a flat dc current. As a result, although the voltage level of VB is dropped below 7.2 volts, the zener diode ZD1 in the upper-limit control circuit 3 will not be actuated to conduct, and there is also no sufficient current to energize the SCR1, and the transistor Q1 remains at cut-off state with the charger indicator 20 continuing not lit thereat, indicating that no charging operation is on. However, when the battery VB discontinues to charge for a duration T2 (as shown in FIG. 4), and the voltage level drops below the predetermined lower-limit (6 V) point Z, the SCR2 will be deenergized because of insufficient current in its anode A, so that the capacitor C3 is also cut off and ceased acting as a filter thereat. In this condition, the current flow from the RF1 resumes its pulsating dc current from therefrom. Meanwhile, the SCR1 is also cut off for the same reason as that of the SCR2, and the transistor Q1 is again to conduct for the pulsating current to flow therefrom with the charger indicator 20 going on, indicating that the charging operation is resumed thereat.

When a power failure occurs in the power source thereof, the relay CR1 is deenergized, and its normally-closed contact CR1-b (contact b) resumes to the closed condition. With the switched 31 and 32 being turned to ON positions, the positive terminal of the battery VB is conducted to the relay CR2. Besides, when the power failure occurs, the capacitor C4 in the discharge actuating circuit 5 will start to discharge, and a forward bias is produced to the base of the transistor Q1, causing it to conduct. At the same time, the relay CR2 is also energized with its contact a (CR2-a) being changed into contact b and becoming a closed circuit thereat. Therefore, the battery VB starts discharging from its positive terminal through CR1-b switch contacts 31-1, 32-2, CR2-a, switch contacts 31-2, 32-1, and the two lights 21 and 22 are lit thereat. As the discharging action of the capacitor C4 is done in a short duration, the conductance of the transistor Q2 is kept through the zener diode ZD3 in the lower-limit discharging control circuit 6. When the lights 21 and 22 continue to be lit for a certain period, the voltage level of the battery VB will be dropped to the lower-limit value (4 V), and the zener diode ZD3 can no longer to enable the conductance thereof, so that the transistor Q2 is cut off, and the relay CR2 is deenergized also with its contact CR2-a returning to the normally-open state, causing the lights 21 and 22 to go out thereat. At this time, as the contact CR2-a becomes a normally-open contact, the circuit between the positive terminal of the battery VB and the zener diode ZD3 is left open without consuming any power thereof. Moreover, as there is no power supply to the capacitor C4, the base of the transistor Q2 and the relay CR2 (no negative power), no power consumption occurs in the emergency light 100. Even if there is no external power source for a long time, the battery VB always keeps a certain power level therein without suffering the impairment incurred by overdischarging operation.

If only one of the lights 21 and 22 is to be used, only one of the switches 31 and 32 corresponding to the selected light is turned on for effecting the emergency lighting and saving more energy therewith.

When the plug 33 is not connected to the external power source, and the light switches 31 and 32 are also turned off with the battery VB in a fully charged condition, the push-button switch 30 can be turned on for lighting the lights 21 and 22. In this condition, the emergency light 100 is used for other lighting purpose.

As can be seen from FIGS. 4 and 5, the charging and discharging characteristic curves C of the known emergency lights can easily cause damage to the storage battery installed therein. With the novel configuration of the preferred embodiment described and illustrated hereinbefore, the charging and discharging operations of the emergency light can be effectively controlled, and the life span of the storage battery together with other elements of the emergency light can also be extended.

While a preferred embodiment has been chosen to illustrate the invention, it will be understood by those skilled in the art that various changes and modifications can be made therein without departing from the spirit and scope of the invention as defined in the appended claims.

What is claimed is:

1. An automatic protective circuit system for emergency lights of the type having a casing body, a left light and a right light separately provided on the top of the casing body, and a storage battery installed therein comprising:
   a power supply means for being connected to the external power source;
   a charging means connected to said power supply means for effecting charging operations;
   an upper-limit charging control means coupled with said charging means for automatically stopping the charging operation thereof;
   a lower-limit charging control means coupled with said charging means for automatically starting the charging operation thereof;
   a lower-limit discharging control means for maintaining a selected power level in the storage battery, a normally-closed contact and a normally-open contact connecting said means with the battery and connecting said means with the lights;
   a discharge actuating means for causing said battery to discharge on failure of said power supply means, said means being connected between said power supply means and said lower-limit discharging control means; whereby, the storage battery of the emergency light can be effectively protected from being overcharged and overdischarged.

2. An automatic protective circuit system according to claim 1 wherein said power supply means comprises:
a transformer having a primary winding and a pair of secondary windings;
a first bridge rectifier having its inputs connected to a secondary winding and its outputs connected to the positive terminal of the storage battery through said charging means;
a second bridge rectifier having its inputs connected to another secondary winding and its outputs connected to said discharge actuating means;
a first relay means for energizing said lights on failure of said power supply means, a contact operated by said relay means and disposed between said power supply means and lights, said relay being coupled between said second bridge rectifier and said discharge actuating means;
and a power indicator connected to said second bridge rectifier for indicating the on and off of the external power source.

3. An automatic protective circuit system according to claim 2 wherein said charging means comprises:
a transistor having its base and collector coupled with the positive output terminal of said first bridge rectifier, and its emitter connected to the positive terminal of the storage battery;
a charger indicator including an LED and a resistor, the anode of the LED being connected to the emitter circuit of said transistor through the resistor and the cathode grounded thereat; and
a diode having its anode connected to the emitter of said transistor and the positive terminal of the storage battery so that charging operation will be automatically effected therewith.

4. An automatic protective circuit system according to claim 3 wherein said upper-limit charging control means comprises in combination: a first silicon controlled rectifier (SCR1), a first parallel R-C circuit, a first zener diode, a first variable resistor, and a plurality of resistors, wherein the anode of said SCR1 is connected to the base of said transistor of said charging means, the cathode coupled with the negative of the storage battery and the gate connected to the positive terminal of the storage battery through the circuit of the parallel R-C, the first zener diode, the first variable resistor, and the normally-open contact of the first relay means so as to effect automatic stop of charging operation upon reaching a predetermined upper-limit level of the storage battery.

5. An automatic protective circuit system according to claim 3 wherein said lower-limit charging control means comprises in combination: a first polarity capacitor, a second SCR2, a second parallel R-C circuit, a second zener diode, a second variable resistor and a plurality of resistors, in which combination the positive terminal of the first polarity capacitor is connected to the collector of the transistor of the charging means while the nagative is coupled with the anode of the second SCR2 whose cathode is grounded and the gate connected to the positive terminal of the storage battery through a circuit formed by the second parallel R-C, the second zener diode, the second variable resistor, and the normally-open contact of the first relay means so that charging operation will be automatically effected upon reaching at a predetermined lower-limit level of the storage battery.

6. An automatic protective circuit system according to claim 5 wherein said lower-limit discharging control means comprises in combination: a pair of double-pole switches having a plurality of input contacts and output contacts, a push-button switch, a second transistor, a second relay circuit, a third zener diode, a resistor and a reversely biased diode, wherein the collector of the second transistor is connected to the output contacts of the double-pole switches and the push-button switch through the reversely biased diode and the second relay circuit, the emitter is grounded thereat, and the base coupled with the input contacts of the double-pole switches and the push-button switch; and the anode of the third zener diode is connected to the base of the second transistor through the resistor while the cathode coupled with the input contacts of the double-pole switches and the push-button switch; thereby, discharging operation will be automatically effected upon reaching at a predetermined lower-limit level of the storage battery.

7. An automatic protective circuit system according to claim 5 wherein said discharge actuating means comprises in combination: a second polarity capacitor having its negative terminal grounded thereat; and a pair of resistors connected in series with one end connected to the positive terminal of the second bridge rectifier and the other end to the base of the second transistor, and the positive terminal of the second polarity capacitor being tapped at the center of the series-connected resistors; whereby, automatic discharging operation will be effected upon the failure of the external power source.

* * * * *